United States Patent
Sand (10) Patent No.: US 9,500,557 B2
(45) Date of Patent: Nov. 22, 2016

(54) PRESSURE TESTING APPARATUS

(71) Applicant: Keith Sand, Calgary (CA)

(72) Inventor: Keith Sand, Calgary (CA)

(*) Notice: Subject to any disclaimer, the term of this patent is extended or adjusted under 35 U.S.C. 154(b) by 288 days.

(21) Appl. No.: 14/452,670

(22) Filed: Aug. 6, 2014

(65) Prior Publication Data
US 2016/0041060 A1    Feb. 11, 2016

(51) Int. Cl.
*G01M 3/28* (2006.01)
*E03B 7/00* (2006.01)

(52) U.S. Cl.
CPC ............ *G01M 3/2815* (2013.01); *E03B 7/003* (2013.01)

(58) Field of Classification Search
CPC .............................. G01M 3/2815; E03B 7/00
See application file for complete search history.

(56) References Cited

U.S. PATENT DOCUMENTS

| | | | |
|---|---|---|---|
| 475,785 A | 5/1892 | Mason | |
| 4,051,687 A * | 10/1977 | Ells | F16L 1/26 405/170 |
| 4,061,015 A | 12/1977 | Fish | |
| 7,395,695 B2 | 7/2008 | Carson | |
| 7,628,056 B2 | 12/2009 | Krah | |
| 2004/0231701 A1* | 11/2004 | Young | B08B 9/0552 134/8 |
| 2007/0113622 A1* | 5/2007 | Buckley | G01M 3/2823 73/49 |
| 2010/0083738 A1* | 4/2010 | Padden | G01M 3/022 73/49.8 |

* cited by examiner

*Primary Examiner* — David Gray
*Assistant Examiner* — Dennis Hancock
(74) *Attorney, Agent, or Firm* — Stephen Lewellyn; Maxey Law Offices, PLLC (57) ABSTRACT

A pipe pressure testing apparatus for failure testing a section of an elongated pipe is provided. The apparatus includes a plurality of spherical bodies disposed within and filling the section of elongated pipe and leaving a void space within the section of elongated pipe. A first end cap is attached to and seals a first end of the elongated pipe. A second end cap is attached to and seals a second of the elongated pipe. And a test fluid line is in fluid communication with the void space to fill the void space with a testing fluid.

14 Claims, 6 Drawing Sheets

PRESSURE TESTING APPARATUS

FIELD OF THE INVENTION

The present invention relates generally to pressure testing piping, and more particularly, relating to a pressuring testing apparatus that partially fills a pipe section with removable bodies to reduce the quantity of testing fluid required to pressurize the pipe section.

BACKGROUND OF THE INVENTION

For the construction or retesting of pipe, whether it is pipelines, process piping within a facility or pressure vessels, the procedure to confirm the integrity of such equipment, as required by regulations, is to apply an internal pressure 1.1 to 1.5 times greater than the maximum allowable operating pressure or maximum operating pressure. The test is used to confirm the quality of the welds and ensure the main body of the pressure equipment can handle the stresses of normal operating conditions and the occasional upset conditions where excessive pressure occurs. The pressure tests is performed using a liquid medium such as water and in some cases a combination of water and an anti-freezing agent (i.e., methanol); this test is called a hydrotest. The alternative to a hydrotest is a pneumatic test that utilizes a gas such as air or nitrogen to provide pressure. The procedure of pressure testing pipe and pipelines is theoretically straightforward but can be very difficult logistically.

When using water to apply pressure, the sheer volume may be difficult and costly to acquire. When it is necessary to add an anti-freezing agent the cost will increase significantly. To complicate it further, it is encouraged to use "fresh" water to prevent contamination, corrosion and the introduction of bacteria. It is beneficial to use "fresh" water, however it is not readily available as is water produced with oil and gas, which is generally abundant at production facilities or near where the pipeline is buried. Fresh water has to be trucked to site to perform a pressure test.

A pneumatic test presents different challenges. Air is readily available but its use is discouraged for it has corrosive properties with even a small concentration of water. Nitrogen, an alternative to air, is an inert gas, meaning non-reactive or non-corrosive, however, it will come at a greater cost when large volumes are required. The greatest concern employing a pneumatic test is the compressibility and "stored energy" of the gas. The results from a rupture can be catastrophic. The sudden release of pressure can launch projectiles several meters if not hundreds of meters and potentially cause fatalities.

While the devices heretofore fulfill their respective, particular objectives and requirements, they do not provide an apparatus for testing long lengths of piping or pipe sections that have bends as such there exists a need for a new apparatus, which substantially departs from the prior art, and in doing so provides an apparatus primarily developed for the purpose of pressure testing piping with reduced testing fluid volume.

SUMMARY OF THE INVENTION

In view of the foregoing disadvantages inherent in the known types of piping pressure testing devices now present in the prior art, the present invention provides a new pressure testing apparatus construction wherein the same can be used for reducing test fluid use.

The inventive process proposed is to use objects to occupy space within a pressure retaining equipment during a pressure test, thereby displacing volume that would normally be occupied by a test medium. The objects are to be made from a non-corrosive material (i.e., high density polyethylene, or HDPE) so not to promote the activity of corrosion such as galvanic corrosion. The shape of the objects are designed so they can be easily added and removed from pressure equipment before and after a pressure test is performed. By inserting the objects a significant fraction of the volume within the pressure equipment will be occupied and reduce the required volume of the test medium.

The embodiments of the present invention reduce the amount of water required to fill a pipeline to be pressure tested. For the smaller diameter pipe (3" and 4") the pipeline volumes are reduced by an average of 52% while the larger diameter pipelines the volumes are reduced by an average of 59%. The spheres will be reusable and therefore the process is environmentally friendly. For the pressure test service companies and pipeline owners it will be a logistical benefit to reduce the amount of water required to ship to the site of the pipeline. The water used for the hydrotest must then be disposed of; it is no longer considered "Fresh" and cannot be reused. Therefore the inventive idea will reduce the amount of disposal water and the associated disposal costs.

As previously discussed, after the construction of, repair or alteration to a pipeline, a hydrotest must be performed. Seasonal conditions, such as freezing temperatures, do not provide a justification to avoid the mandatory procedure. The owner may postpone it until conditions are favorable but will not be permitted to start or continue production. This will lead to lost production time, representing tens or hundreds of thousands or even millions of dollars. In most cases an anti-freezing agent is added to prevent freezing, increasing the cost of the pressure test significantly, see the example below:

Example:

Hydro-testing a 1 km long, 8 inch nominal schedule 40 pipeline would require 31.65 m3 of liquids to fill it, not including the additional fluids to raise the pressure 1.5 times the MAWP. In freezing conditions it is reasonable to assume half of the volume to be methanol. Considering the cost of the methanol alone, at which the price is $1,350/m3, it will cost $21,364. Adding the properly sized solid spheres, those with a diameter difference of 1 cm for clearance into the pipeline, to displace 19.05 m3 of liquids, the total volume of liquid medium is reduced to 12.6 m3, of which 6.3 m3 is methanol. The cost for the methanol alone will now be $8,505, a total savings of $12,859. This does not include the cost of the water, the cost to ship it to site and the disposal cost of all of the liquids. Embodiments of the present invention will reduce the volume of required liquids and subsequently, the cost as well by an estimated 50-60%.

Additionally, the majority of pipelines transporting production or processed fluids are buried, and in some cases these pipelines cross under or near water-courses. It is the responsibility of the owner to ensure the hydrotest liquids do not enter the water-course. A pipeline normally transporting hydrocarbons will contain product residue and therefore during a hydrotest the liquid medium will become contaminated. This poses a threat to aquatic flora and fauna if a rupture were to occur to the pipeline during a pressure test in the vicinity of the water-course. Presently, there are a number of safeguards an owner can employ to prevent the contaminant from entering the water-course. These are not guaranteed to be 100% successful, particularly with large volumes of test medium. Additionally, with large volumes of pressure test liquids the task to setup the safeguards are time consuming and expensive.

Embodiments of the present invention reduce the volume of the test medium by half or better. By reducing the volume of the test medium it will increase the rate of success of the safeguards to prevent contamination into water-courses. If, in a low lying area, the tested pipeline ruptures the reduced volume can more easily be retained or prevented from entering the water-course and cleaned from the ground.

Further yet, a pneumatic test, for all tense and purposes is not a favorable alternative to a hydrotest because of the inherent danger associated with compressed gas. If a rupture were to occur during the test the results can be catastrophic. For process piping and pressure vessels ABSA, the Alberta Pressure Equipment Safety Authority has limited the maximum stored energy value to 1,677 kJ.

Most owners and operators prefer not to approach the maximum Stored Energy value. The inventive process will make the pneumatic test safer. The Stored Energy is proportional to the volume and therefore by replacing the volume of air with a solid there is less Stored Energy. Ideally, the Solid would a Cylindrical or Rod shape so it would be large enough to remain in the pipeline if a rupture were to occur, rather than become a projectile. See the example below to compare the stored energy:

Example:

A length of pipe that can be used with the maximum allowable Stored Energy of 1,677 kJ ($1.677 \times 10^6$ N·m) is calculated using the stored energy equation as follows: Stored Energy=$(k/(k-1))PV[1-(Pa/P)^{(k/(k-1))}]1000$.

For a 3 inch (88.9 mm) schedule 40 pipeline using air for the test medium; Ratio of Specific Heat for Air, k=1.4, Atmospheric Pressure Pa=103 kPa, Pneumatic Test Pressure P=11,000 kPa and the Stored Energy equal to 1,677 kJ or 1,677,000 N·m; Internal Cross Sectional Area $4.78 \times 10^{-3}$ m2.

The total length of a 3" nominal schedule 40 pipe is limited to 9.1 m. The total volume of the pipe is 0.0435 m3. The cylinders are sized to have 0.005 m smaller radius. This equates to the cylinders having an out diameter of 0.068 m while the pipe has an inner diameter of 0.078 m. The volume of the cylinders displacing the liquids is as follows: V=A× L=$\bar{\omega}r2$=3.1416×(0.034 m2)×9.1 m=0.033 m3.

For the same 9.1 m long 3" nominal schedule 40 pipe employing the Volume Displacement Process and using the solid cylinders which displace 76% of the pipe under the same test pressure, the total Stored Energy would 24% of the maximum allowable Storage Energy, equaling 402.5 kJ. Therefore the pneumatic test becomes significantly safer.

In some cases a pneumatic test is the only possible means of pressure testing some vessels; primarily those with weight restrictions. The foundation and supports for the vessel are designed for a certain weight and therefore, when it is necessary to pressure test, it can only undergo a pneumatic test. As discussed above a pneumatic test is very dangerous. A hydrotest is a safer test and should be used whenever possible. By using the designed hollowed spheres to displace the volume of the water the weight inside the vessel is reduced significantly. The example below demonstrates the weight difference inside of a pipeline since the formation of the spheres is straight forward and the calculations are simple. A vessel would require a significantly more information to calculate.

Example:

Using an 8" nominal schedule 40 pipeline for example, a hollow sphere with an outer diameter of 0.0955 m will have a wall thickness of 0.005 m; it will be constructed out of HDPE with a s.g. of 0.96 and a density of 960 kg/m3.

The water it is displacing has a density of 1000 kg/m3. The volume the sphere displaces is determined by the equation V=$4\bar{\omega}r3/3$ and called V1. The volume of the hollow section of the sphere is determined the same way but the inner diameter of the sphere is 0.010 m less; it will be called V2. V1=4×3.1416×(0.0955 m)3/3=0.00365 m3. V2=4× 3.1416×(0.0905 m)3/3=0.00310 m3. The total volume of HDPE is V3=V1−V2=0.00365 m3−0.00310 m3; V3=0.00054 m3.

The mass of the hollow sphere (Ms) will be determined by multiplying the volume by the density: Ms=V3× ρHDPE=0.00054 m3×960 kg/m3=0.52 kg.

The mass of the water (Mw) is equal to the Volume occupied by the sphere (V1) times the density of water: Mw=V1×ρw=0.00365 m3×1000 kg/m3=3.65 kg.

The difference in weight is (1−Ms/Mw)×100%=(1− 0.14)×100%=86%.

The total weight difference in 1 km long 8" nominal schedule 40 pipeline where 60% of the pipeline is occupied by spheres is determined below:

Total volume of water (VT) of the pipeline without spheres is 31.65 m3 and the Volume displaced by the spheres (Vs) is 19.05 m3 and the Volume remaining occupied by the water is Vw=VT−Vw=31.65−19.05=12.6 m3.

The total weight of the water and spheres is: MT=Ms× Ns+Vw×ρw. Where Ns is the number of spheres in a 1 km pipeline=1000 m/0.191 m=5,235. MT=0.52×5,235+12.6 m3×1000 kg/m3=2,732 kg+12,600 kg=15,332 kg. Without the spheres the weight would be 31,650 kg. The weight difference is 16,318 kg or 51.6% less. The difference of weight could make a hydrotest possible for the vessels that normally have to have a pneumatic test.

Embodiments of the present invention include adding solid or hollow rods into piping within a facility that will allow the test to take place safer, quicker and easier. Many locations of pipe are high above the ground and to have access, scaffolding must be erected. In some cases, to fill the pipe large volumes of water must be hoisted or carried to the platform and added slowly. Installing properly sized rods into the pipe prior to adding the pressure test medium will reduce the volume and time to perform the test. This will increase the health of the operators by reducing the repetitive motion associated with hoisting or hauling the pressure test medium up extended heights.

For facility pipe the greatest advantage this inventive idea could provide is for the newly constructed and particularly large diameter piping. There are instances when water is not readily available at that location and must be brought by 5 gallon (19 L) bottles. Based on the example prepared below, the calculated total volume required to fill the piping is 369 L and this equates to 20, 5 gallon bottles. If the volume inside the pipe could be reduced by 85% the total number of bottles would be a significant difference. Additionally, when a hydrotest is unsuccessful on the first attempt, even for minor oversights, the test must stop and be restarted. This could equate to more water required to be brought to the site. The current and favorable alternative is hiring a pressure test vendor who trucks the water to site for a relatively large fee.

Example:

For a 5 m long 12" nominal schedule 80 pipe the diameter and wall thickness in meters are 0.324 m and 0.0175 m respectively. The total volume is: V=A×L= $\bar{\omega}r2$=3.1416×(0.162−0.0087 m)2×5 m=0.369 m3 or 369 L.

In general, in one aspect, a pipe pressure testing apparatus for failure testing a section of an elongated pipe is provided.

The apparatus includes a plurality of spherical bodies disposed within and filling the section of elongated pipe and leaving a void space within the section of elongated pipe. A first end cap is attached to and seals a first end of the elongated pipe. A second end cap is attached to and seals a second of the elongated pipe. And a test fluid line is in fluid communication with the void space to fill the void space with a testing fluid.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings.

DETAILED DESCRIPTION OF THE INVENTION

With reference to FIGS. 1-4, there is representatively and diagrammatically illustrated a new apparatus 10 in accordance with an embodiment of the present invention for internal pressure testing a pipe section 12. Pipe section 12 could be a section of a pipeline, process piping, or any other piping that requires pressure testing. For example, as representatively illustrated, pipe section 12 is a continuous length of a pipeline that has several bends along its length.

Pressure testing apparatus 10 includes a plurality of bodies 14 disposed internally within the pipe section 12 and along the entire length of the pipe section. Bodies 14 partially fill the internal volume of the pipe section 12 to reduce an amount of testing fluid required to fill void space 24 and pressurize the pipe section for pressure testing. A first end 16 of the pipe section 12 is sealed by a first end cap 18 and the opposite, second end 20 of the pipe section is sealed by a second end cap 22. End caps 18 and 22 may be blind flanges that are bolted to corresponding flanges at respective ends 16 and 20 of the pipe section.

In an embodiment, end cap 18 is fitted with a nipple 26 or other line coupling to connect a test fluid line 28 to the end cap and in fluidic communication with the void space 24 so that testing fluid can be introduced into the pipe section 12 from a source of testing fluid 30 and fill the void space 24 and pressurize the pipe section to a desired test pressure. A pressure gauge could be installed along test fluid line 28 to monitor pressurization of the pipe section 12. Alternatively or additionally, a pressure gauge 32 could be installed on end cap 22 and in fluidic communication with void space 24 to monitor pressurization of the pipe section 12.

Bodies 14 are shaped to be easily inserted and removed from the section of pipe and are constructed of a suitable non-corrosive material. Suitable, non-corrosive materials include polyethylene, low density polyethylene, medium density polyethylene, high density polyethylene, for example.

Figure 1:
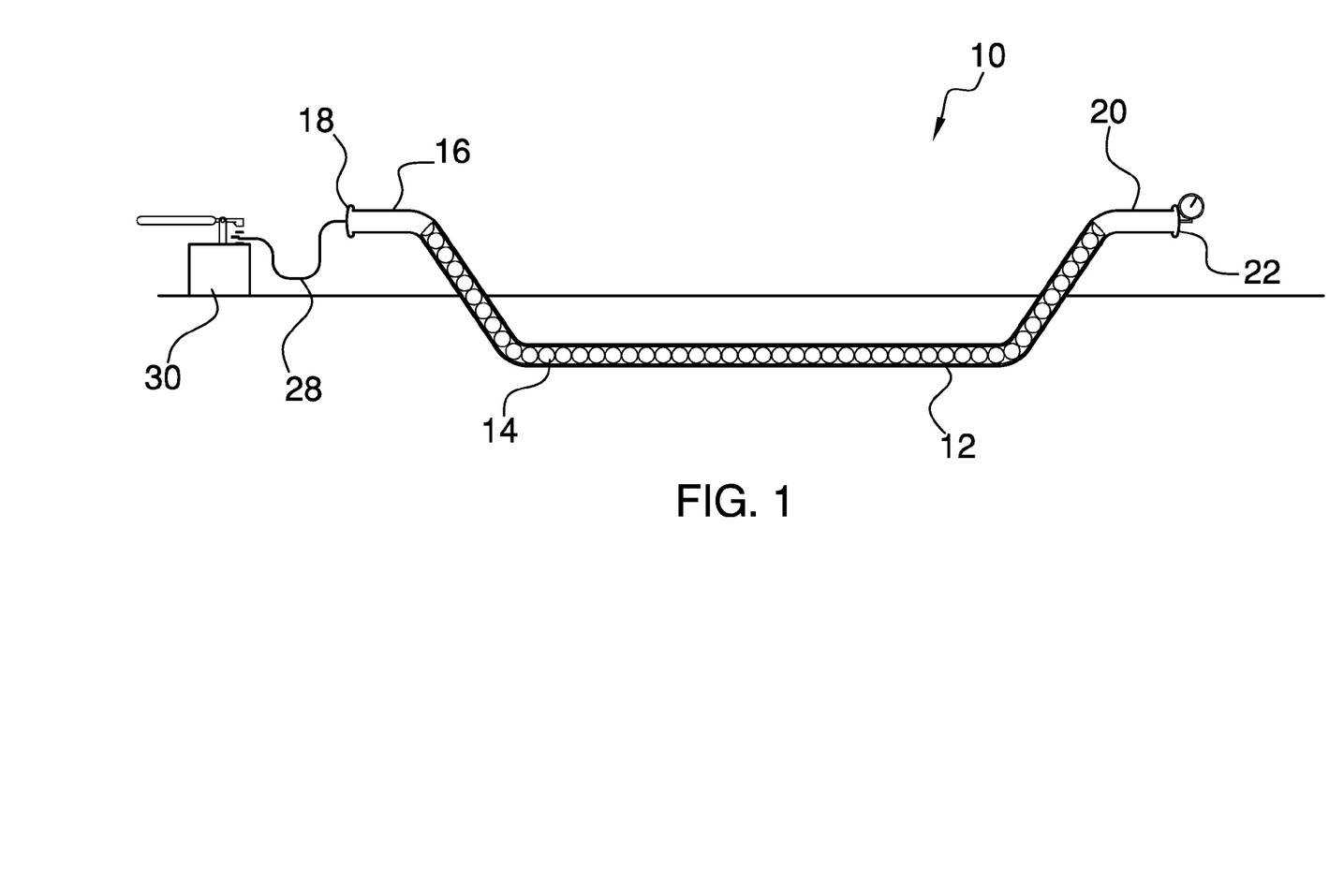
FIG. 1 is a diagrammatic view of a pressure testing apparatus in accordance with an embodiment of the present invention.
Figure 2:
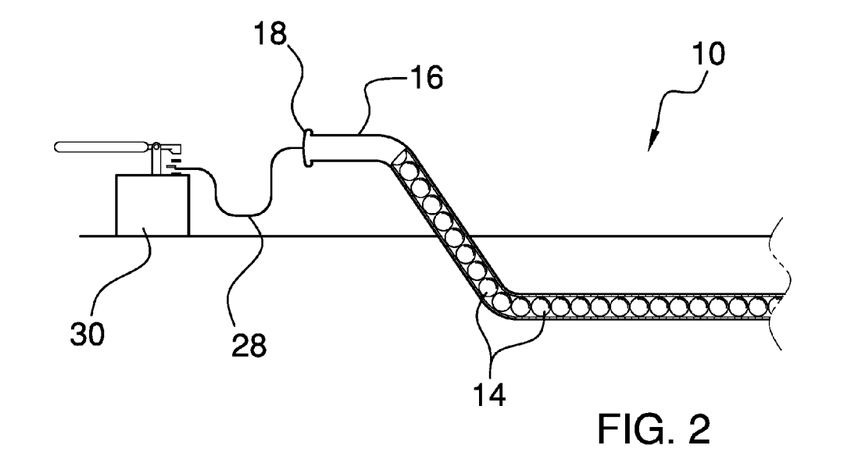
FIG. 2 is a diagrammatic, enlarged view of the end of the pressure testing apparatus of FIG. 1.
Figure 3:
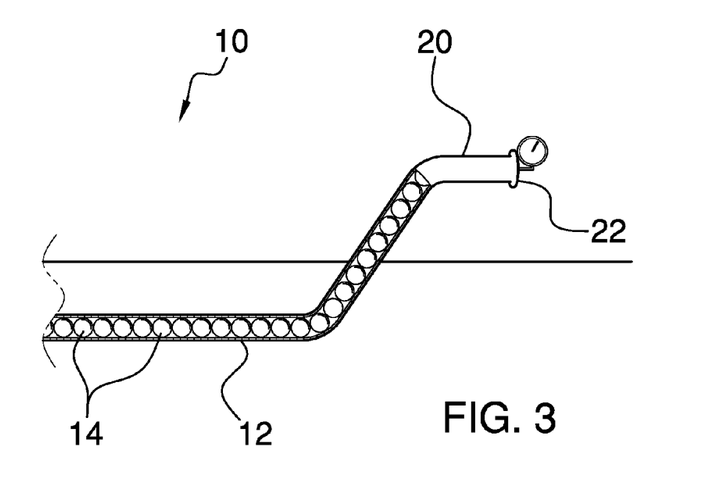
FIG. 3 is a diagrammatic, enlarged view of the opposite end of the pressure testing apparatus of FIG. 1.
Figure 4:
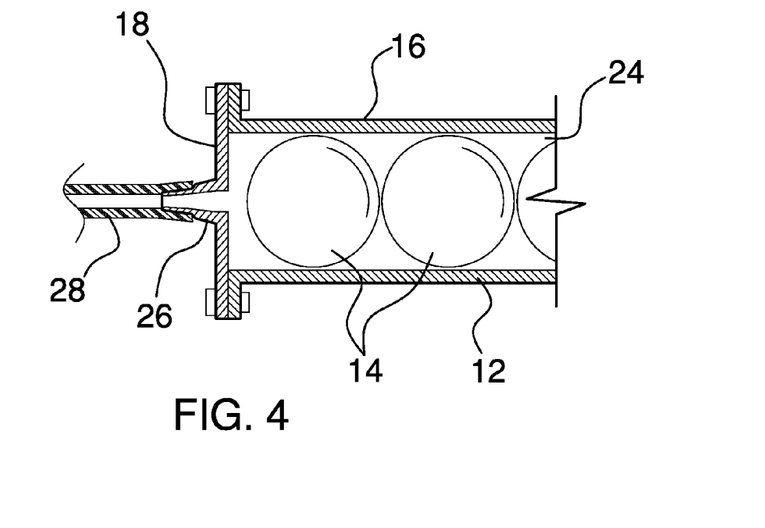
FIG. 4 is a diagrammatic cross-sectional view of the first end of the apparatus of FIG. 2.
Figure 5:
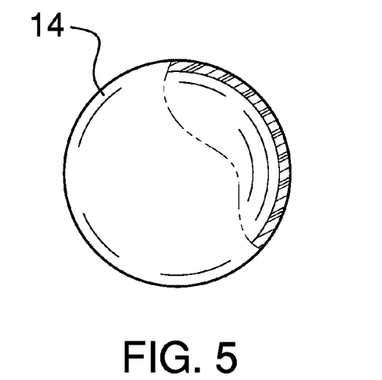
FIG. 5 is a diagrammatic view of a hollow spherical shaped body.
Figure 6:
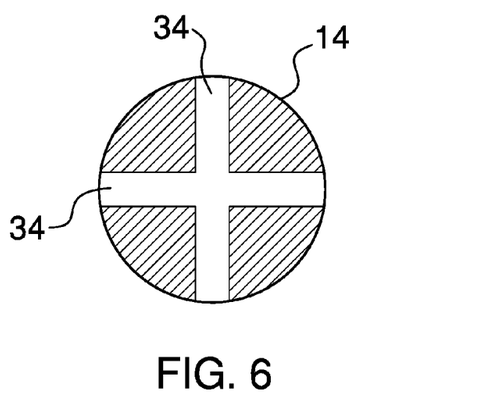
FIG. 6 is a diagrammatic view of a solid spherical shaped body.
Figure 7:
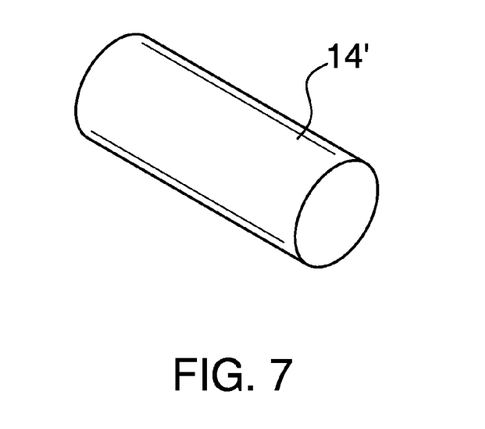
FIG. 7 is a diagrammatic perspective view of a cylindrical shaped body.
Figure 8:
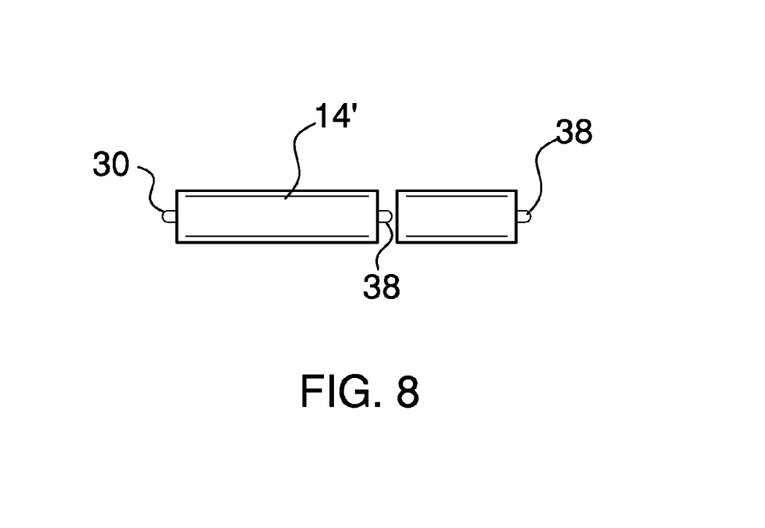
FIG. 8 is a diagrammatic side view of a series of cylindrical shaped bodies connected together end-to-end.

Bodies 14 are shaped so that they are easily insertable and removable from the pipe section. For example, as illustrated, each body 14 can be spherical shaped and sized so as to substantially fill the diameter of the pipe section 12 while permitting the body to freely pass through and along the length of the pipe section. In an embodiment, the spherical body 14 is sized to have a diameter between 1.0 and 1.5 cm less than the internal diameter of the pipe section plus the root of any circumferential welds that extend inwardly from the sidewall of the pipe section. Spherical body 14 may be hollow, as seen in FIG. 5. Alternatively, spherical body 14 could be solid and could have one or more passages 34 extending completely through the body to allow fluid to pass through the body, as seen in FIG. 6.

Figure 9:
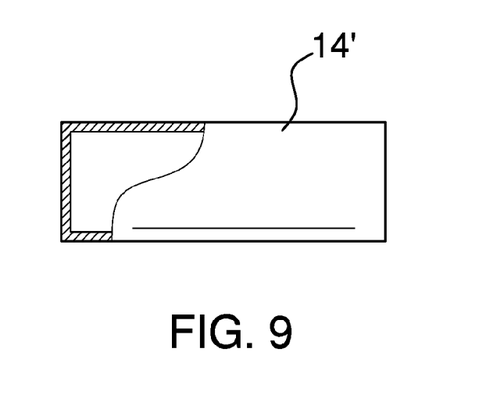
FIG. 9 is a diagrammatic view of a hollow cylindrical shaped body.
Figure 10:
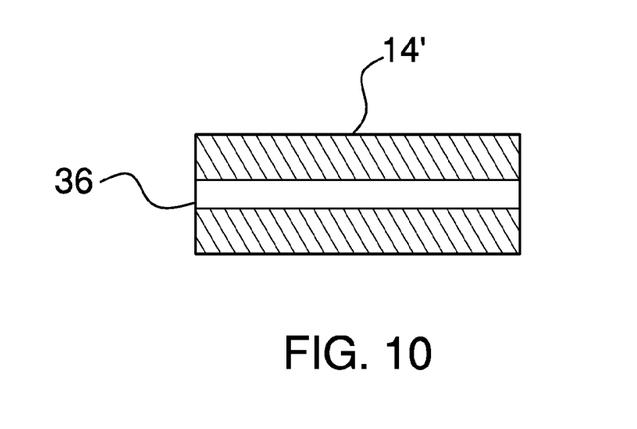
FIG. 10 is a diagrammatic view of a solid cylindrical shaped body.

Bodies 14 could also be cylindrically shaped as opposed to spherical shaped, as seen in FIGS. 7-10. Similar to spherical shaped bodies, cylindrically shaped are sized so as to substantially fill the diameter of the pipe section 12 while permitting the body to freely pass through and along the length of the pipe section. In an embodiment, the cylindrically shaped body 14' is sized to have a diameter between 1.0 and 1.5 cm less than the internal diameter of the pipe section plus the root of any circumferential welds that extend inwardly from the sidewall of the pipe section. Cylindrical body 14' may be hollow, as seen in FIG. 9. Alternatively, cylindrical body 14' could be solid and could have one or more passages 36 extending completely through the body to allow fluid to pass through the body, as seen in FIG. 10. Additionally, each end of cylindrical body 14' could include a coupling 38 to allow them to be connected together end-to-end as they are inserted into the pipe section to form a continuous interconnected string, which makes removing them from the pipe section easier.

Figure 11:
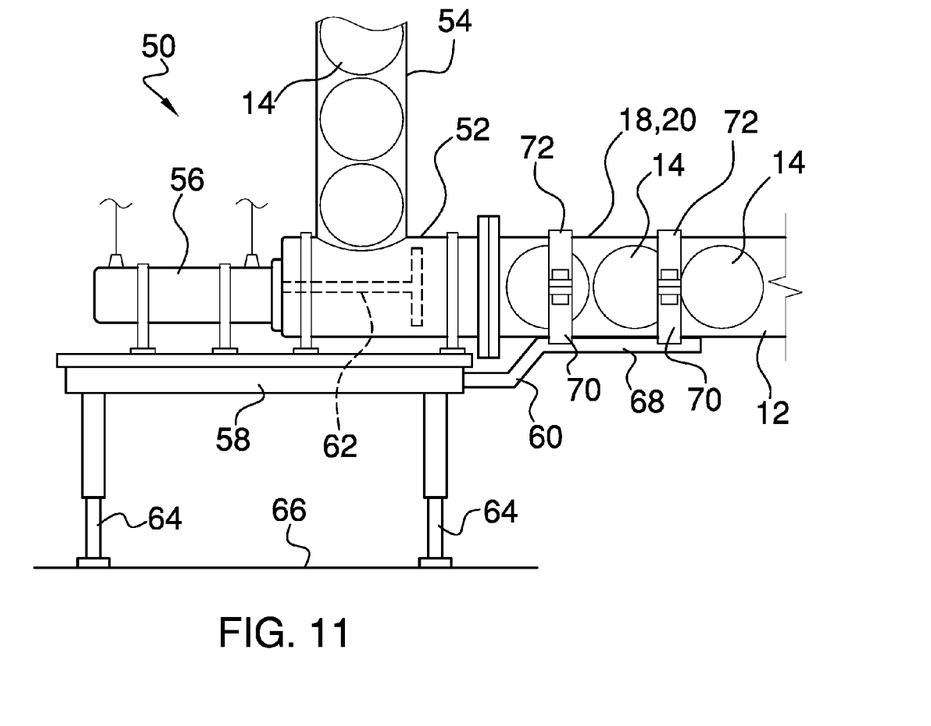
FIG. 11 is a diagrammatic view of a spherical body loading apparatus constructed in accordance with an embodiment of the present invention.
Figure 12:
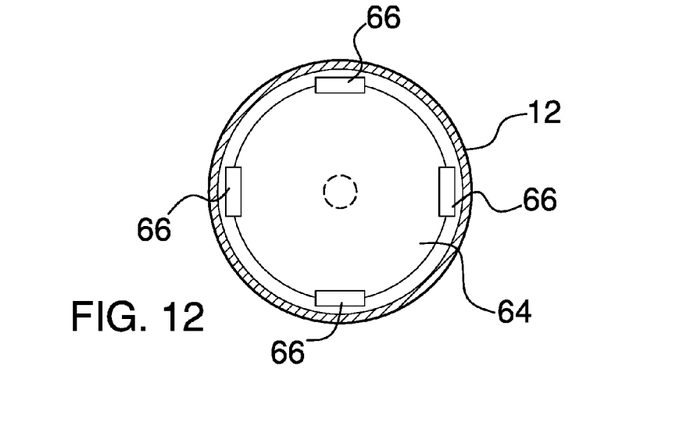
FIG. 12 is a diagrammatic cross-sectional view of a tubular guide of the spherical body loading apparatus of FIG. 11.

With reference to FIGS. 11-12, apparatus 10 may include a spherical body loading apparatus 50 that is mountable to an end 18, 20 of the pipe section to load spherical bodies 14 into the pipe section. Loading apparatus 50 is used, for example, when the number of spherical bodies 14 disposed in the pipe section become too great to permit further manual insertion. Loading apparatus 50 includes a tubular guide 52, a chute 54, an operator 56, a support platform 58, and a clamp 60.

Apparatus 50 is connected to the pipe section 12 to align the end of the tubular guide with the open end of the pipe section, by clamp 60 for example. Chute 54 is connected to the tubular guide 52 so that spherical bodies 14 loaded into the chute are directed into the tubular guide for insertion into the pipe section 12. Operator 56, such as a hydraulic cylinder, is connected to the opposite end of the guide 52 and includes a reciprocating arm 62 that is disposed within the tubular guide. The end of the arm 62 is fitted with a pusher 64 that pushes against spherical bodies 14 located in the tubular guide 52 and inserts them into the pipe section when the arm is extended. A plurality of rollers 66 may be attached along the circumference of the pusher to center the pusher within the tubular guide 52 and provide rolling contact between the pusher and the tubular guide.

A spring loaded door (not shown) could be disposed to close and open the chute for depositing spherical bodies 14 into the tubular guide. For example, to prevent depositing spherical bodies 14 into the tubular guide 52, when the pusher is advances past the chute in a direction toward the pipe section the door closes and then opens when the pusher is withdrawn past the chute in a direction away from the pipe section.

Similarly, a gate (not shown) can be disposed across the end of the tubular guide 52 and operated to open and close the end of the tubular guide to prevent spherical bodies 14 from pushing outwardly from the pipe section when the pusher is withdrawn. The gate could be spring loaded or could be operated by any other suitable means, such as, for example a solenoid.

The tubular guide 52, the chute 54, and the hydraulic cylinder 56 are supported by platform 58. Platform 58 includes a plurality of ground engaging legs 64 that support the platform on a ground surface 66. Legs 64 are adjustable to raise and lower the height of the platform to align the tubular guide 52 with the end of the pipe section. Further clamp 60 may be used to secure the loading apparatus to the pipe section. For example, clamp 60 includes a lower portion 68 that ends below the pipe section and includes one or more lower saddle clamp members 70 to which are secured upper saddle clamp members 72 to encircle the pipe section.

A number of embodiments of the present invention have been described. Nevertheless, it will be understood that various modifications may be made without departing from the spirit and scope of the invention. Accordingly, other embodiments are within the scope of the following claims.

What is claimed is:

1. A pipe pressure testing apparatus for failure testing a section of an elongated pipe, the apparatus comprising:
   a plurality of spherical bodies disposed within and filling the section of elongated pipe and leaving a void space within the section of elongated pipe;
   a first end cap attached to and sealing a first end of the elongated pipe;
   a second end cap attached to and sealing a second of the elongated pipe; and
   a test fluid line in fluid communication with said void space to fill said void space with a testing fluid.

2. The pipe pressure testing apparatus of claim 1, wherein one or more of said spherical bodies is hollow.

3. The pipe pressure testing apparatus of claim 1, wherein one or more of said spherical bodies is solid.

4. The pipe pressure testing apparatus of claim 3, wherein one or more of said solid spherical bodies includes one or more passages extending completely therethrough.

5. The pipe pressure testing apparatus of claim 1, further comprising a pressure gauge in fluidic communication with said void space.

6. The pipe pressure testing apparatus of claim 1, further comprising a line coupling extending through said first end cap, and wherein said test fluid line is connected to said line coupling.

7. The pipe pressure testing apparatus of claim 1, wherein one or more of said spherical bodies is constructed of a non-reactive material.

8. The pipe pressure testing apparatus of claim 7, wherein said non-reactive material is selected from the group consisting of polyethylene, low density polyethylene, medium density polyethylene, and high density polyethylene.

9. The pipe pressure testing apparatus of claim 7 further comprising a spherical body loading apparatus comprising:
   a tubular guide connectable to an end of the section of elongated pipe;
   a hydraulic piston having a reciprocating arm extending along said tubular guide;
   a pusher attached to said reciprocating arm and disposed within said guide; and
   a chute connected to said tubular guide to direct spherical bodies loaded in said chute into said tubular guide.

10. The pipe pressure testing apparatus of claim 9, wherein said spherical body loading apparatus further comprises:
    a platform, said tubular guide, said hydraulic piston, and said chute supported by said platform;
    a plurality of legs attached to said platform and extending downwardly therefrom to support said platform on a ground surface.

11. The pipe pressure testing apparatus of claim 10, wherein each of said plurality of legs is adjustable in length so as to enable adjusting the height of said platform.

12. The pipe pressure testing apparatus of claim 11, wherein said spherical body loading apparatus further comprises:

a plurality of ground engaging leg anchors to secure each leg to the ground surface.

13. The pipe pressure testing apparatus of claim 9, wherein said spherical body loading apparatus further comprises:
   a pipe clamp connected to said tubular guide, said pipe claim securable to the length of section of pipe to align said guide with the length of section of pipe.

14. The pipe pressure testing apparatus of claim 13, wherein said pipe clamp encircles the length of section of pipe.

* * * * *